United States Patent [19]

Hayashi

[11] Patent Number: 5,382,900
[45] Date of Patent: Jan. 17, 1995

[54] MULTI-DISPLACEMENT DETECTING APPARATUS FOR DETECTING ROTARY AND RADIAL DISPLACEMENT WITH TWO PAIR OF SENSORS

[75] Inventor: Yasukazu Hayashi, Niwa, Japan

[73] Assignee: Okuma Corporation, Aichi, Japan

[21] Appl. No.: 171,619

[22] Filed: Dec. 22, 1993

Related U.S. Application Data

[62] Division of Ser. No. 948,309, Sep. 22, 1992.

[30] Foreign Application Priority Data

Sep. 25, 1991 [JP] Japan .................................. 3-273176

[51] Int. Cl.$^6$ .......................... G01B 7/14; G01B 7/30; G06F 15/20
[52] U.S. Cl. .......................... 324/207.23; 324/207.21; 324/207.25; 340/671; 340/683
[58] Field of Search .................. 324/207.14, 207.21, 324/207.23–207.26, 252; 338/32 H, 32 R; 340/671, 672; 318/652, 653, 661

[56] References Cited

U.S. PATENT DOCUMENTS

4,629,982 12/1986 Kieslich .......................... 324/207.23
5,065,095 11/1991 Suzuki .......................... 324/207.25
5,155,696 10/1992 Shibata et al. .................. 364/571.01
5,220,282 6/1993 Zimmermann .............. 324/207.25 X

Primary Examiner—Walter E. Snow
Assistant Examiner—Jay M. Patidar
Attorney, Agent, or Firm—Wenderoth, Lind & Ponack

[57] ABSTRACT

Multiple output signals of rotary displacement sensors of a machine tool spindle are processed by a multi-displacement detector to detect a displacement which is different from a radial displacement in a moving direction. This results in a reduced number of displacement sensors. The multi-displacement detector includes: a moving section whose surface is continuously irregular in the moving direction; a stationary section including a plurality of sensors each outputting a signal that contains an output component whose level is proportional to a sine-wave value of a displacement in the moving direction and has an amplitude modulated in proportion to a variation in the gap from the irregular surface; and an arithmetic logic device for receiving the output signals of the plurality of sensors and for outputting signals indicative of a displacement in the moving direction and another at least one displacement of the moving section.

2 Claims, 9 Drawing Sheets

MULTI-DISPLACEMENT DETECTING APPARATUS FOR DETECTING ROTARY AND RADIAL DISPLACEMENT WITH TWO PAIR OF SENSORS

This is a divisional application of Ser. No. 07/948,309, filed Sept. 22, 1992.

BACKGROUND OF THE INVENTION

1. Field of the Invention

The present invention relates to a multi-displacement detecting apparatus capable of simultaneously detecting a plurality of displacements including a rotary displacement and a radial displacement of a spindle of a machine tool.

2. Description of the Related Art

A conventional multi-displacement detecting apparatus designed for the spindle of a machine tool using a magnetic bearing and having a built-in motor requires multiple sensors such as a rotary displacement sensor for controlling a rotational speed or a position of the motor and a radial displacement sensor for assisting the magnetic bearing in controlling the radial position of the spindle.

Figure 1:
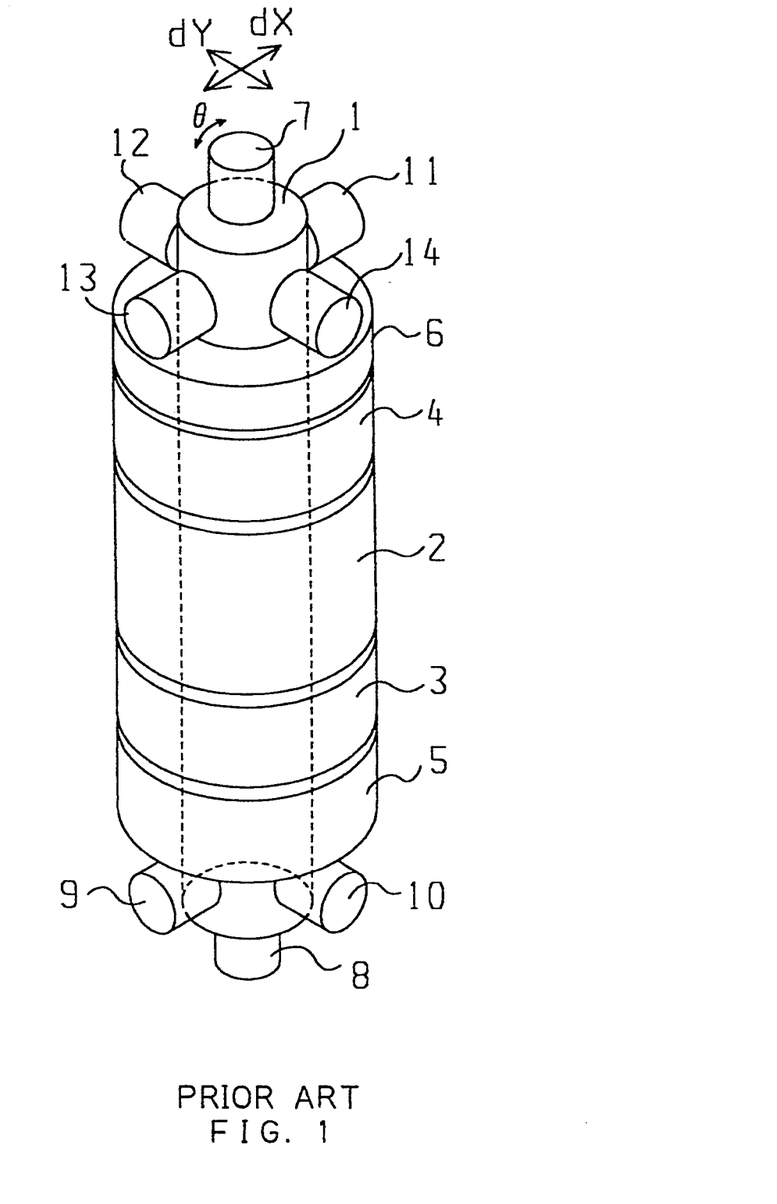
FIG. 1 is an oblique view of modeled example of a spindle using a magnetic bearing with a conventional multi-displacement detecting apparatus incorporated therewith and having a built-in motor.

FIG. 1 is an oblique view of a modeled example of the spindle using a magnetic bearing with a conventional multi-displacement detecting apparatus incorporated therewith and having a built-in motor. A shaft (spindle) 1 is provided with a motor 2, a magnetic thrust bearing 3, magnetic radial bearings 4 and 5, and a resolver 6 for detecting a rotary displacement of the rotor and thus controlling the rotation of the motor 2. Then, thrust displacement sensors 7 and 8 for controlling the magnetic thrust bearing 3 are mounted on the ends of the shaft 1. Radial displacement sensors 9 and 10 for controlling the magnetic radial bearing 5, and radial displacement sensors 11, 12, 13 and 14 for controlling the magnetic radial bearing 4 are mounted on the side of the shaft 1.

Figure 2:
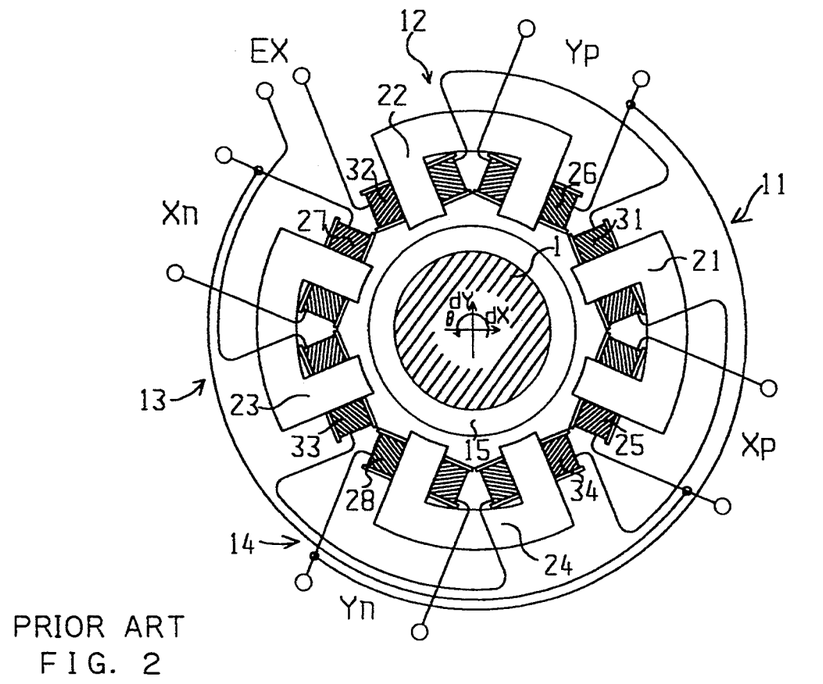
FIG. 2 shows an example of structures of the radial displacement sensors of FIG. 1.
Figure 3:
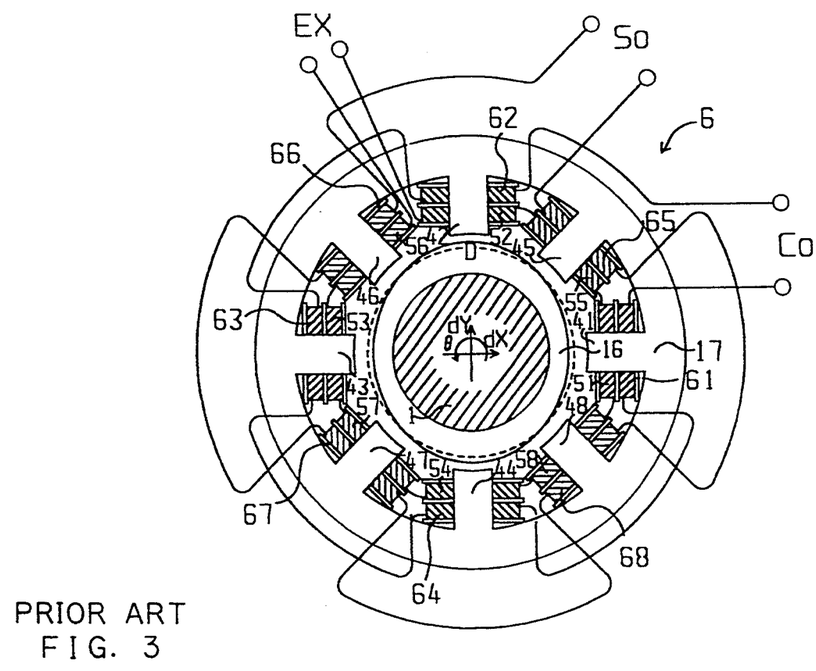
FIG. 3 shows an example of a structure of the resolver.
Figure 4:
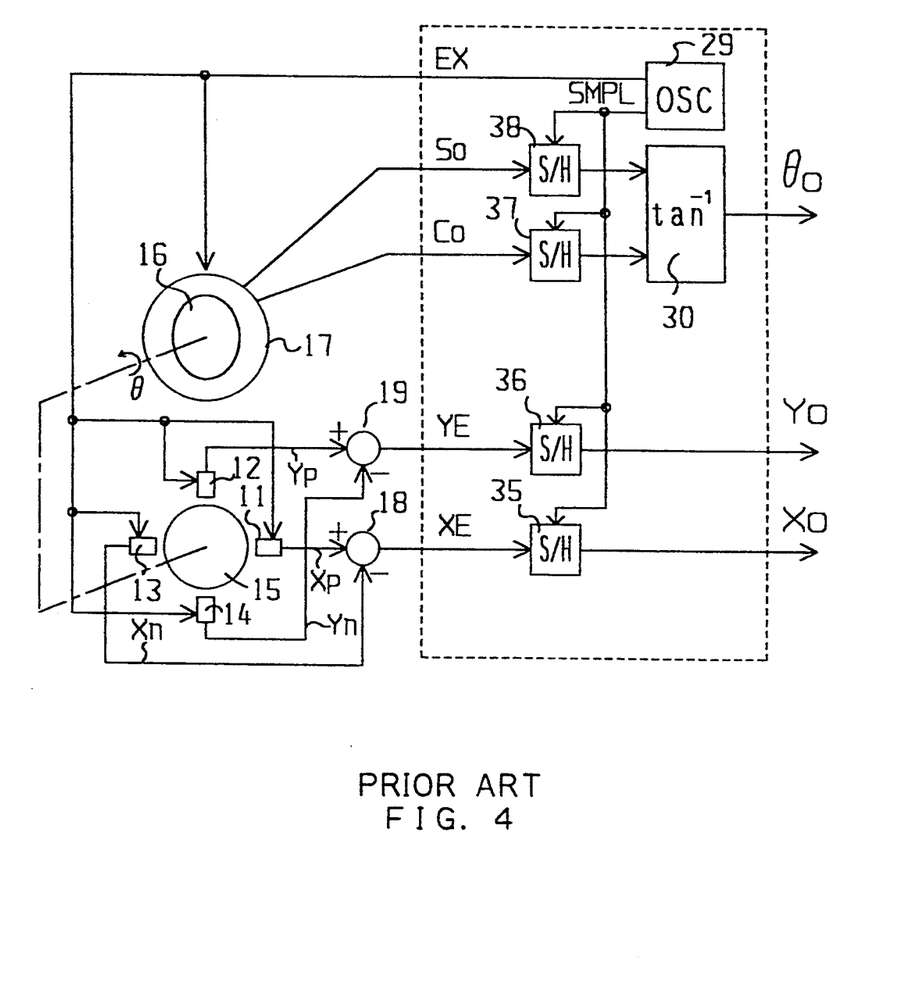
FIG. 4 is a block diagram showing an example of a conventional multi-displacement detecting apparatus.

FIG. 2 shows an example of the structures of the radial displacement sensors 11, 12, 13 and 14 shown in FIG. 1. FIG. 3 shows an example of the structure of the resolver 6 shown in FIG. 1. FIG. 4 is a block diagram showing an example of a conventional multi-displacement detecting apparatus made up of the radial displacement sensors, the resolver, and a detecting circuit that uses multiple arithmetic logic units to convert the detected signals sent from the sensors and resolver into quantities of displacement. C-shaped cores 21, 22, 23 and 24 each having two teeth and made of silicon steel or another magnetic substance are arranged around a shaft 1, to which a silicon steel or other magnetic substance-made cylinder 15 is attached, at intervals of 90° so that the teeth will face the center of the shaft 1. Each of primary coils 31, 32, 33 and 34 is respectively wound around one of the teeth of each of the C-shaped cores 21, 22, 23 and 24. The primary coils 31, 32, 33 and 34 are connected in series and excited with an AC signal EX from an oscillator 29. Each of secondary coils 25, 26, 27 and 28 is respectively wound around the other tooth of each of the C-shaped cores 21, 22, 23 and 24. Of the secondary coils 25 to 28, mutually-opposing coils 25 and 27, and 26 and 28 are connected in series respectively so that the output signals their mates provide will be 180° out of phase.

In each of the radial displacement sensors 11, 12, 13 and 14 constituted as mentioned above, the reluctance varies with the variations in air gaps between the C-shaped cores 21, 22, 23 and 24 and the magnetic substance cylinder 15 that are attributable to a displacement in the position of the shaft 1. The variation in reluctance causes the secondary coils 25, 26, 27 and 28 to provide the output signals Xp, Yp, Xn and Yn. The output signals Xp, Yp, Xn and Yn are determined by X- and Y-axis displacements dX and dY, and represented as expressions (1) to (4).

$$Xp = (K + dX) \cdot EX \quad (1)$$

$$Yp = (K + dY) \cdot EX \quad (2)$$

$$Xn = (K - dX) \cdot EX \quad (3)$$

$$Yn = (K - dY) \cdot EX \quad (4)$$

where, K is a constant coefficient.

The output signals Xp and Xn or Yp and Yn are reverse in polarity and connected in series. Then, subtractors 18 and 19 perform subtractions of the below expressions (5) and (6) on the output signals.

$$XE = Xp - Xn = 2dX \cdot EX \quad (5)$$

$$YE = Yp - Yn = 2dY \cdot EX \quad (6)$$

These two output signals XE and YE are sampled and held by an SMPL signal from the oscillator 29 by sample-and-hold circuits 35 and 36, when an AC signal EX shows a maximum gain. Assuming that the maximum gain of the AC signal EX is "½", the output signals Xo and Yo of the sample-and-hold circuits 35 and 36 are given by assigning "EX=½" to the expressions (5) and (6) or represented as the below expressions (7) and (8).

$$Xo = dX \quad (7)$$

$$Yo = dY \quad (8)$$

Thus, the displacements in the X-axis and Y-axis directions of the shaft 1 can be detected.

A ring-type stator core 17 made of a silicon copper plate or other magnetic substance plate has eight teeth 41, 45, 42, 46, 43, 47, 44 and 48 arranged at intervals of 45° on its inner circumferential surface. Primary coils 51, 55, 52, 56, 53, 57, 54 and 58, which are wound around the teeth 41, 45, 42, 46, 43, 47, 44 and 48 of the stator core 17 to face different directions, are connected in series and excited with the AC signal EX from the oscillator 29. Secondary coils 61, 65, 62, 66, 63, 67, 64 and 68 are wound around the teeth 41, 45, 42, 46, 43, 47, 44 and 48 of the stator core 17. Of the secondary coils, four alternate coils 61, 62, 63 and 64, or 65, 66, 67 and 68 are connected in series so that they will provide 180° out-of-phase output signals alternately. A cylindrical resolver rotor 16 made of the silicon steel or another magnetic substance is attached to the shaft 1, which is waxing or waning at two points in comparison with a circle indicated by a dashed line D.

In the resolver 6 having the foregoing configuration, the reluctance varies with the displacement in the position of the shaft 1 and the variations in air gaps between the teeth 41, 45, 42, 46, 43, 47, 44 and 48 of the stator core 17 and the resolver rotor 16. The variation in reluctance causes the secondary coils 61, 65, 62, 66, 63, 67, 64 and 68 to provide output signals CXp, SAp, CYp, SBp, CXn, SAn, CYn and SBn. These output signals are determined by the rotary displacement of the shaft 1 and the X- and Y-axis displacements dX and dY, and represented as expressions (9) to (16). That is to say, the output signals CXp, SAp, CYp, SBp, CXn, SAn, CYn and SBn contain components whose levels are proportional to a sine-wave value of a rotary displacement, and have amplitudes modulated according to the variations in the gaps between the teeth and the resolver rotor 16.

$$CXp = (L+dX) \cdot (M + \text{COS}(2 \cdot (\theta + dY/R))) \cdot EX \quad (9)$$

$$SAp = (L+dA) \cdot (M + \text{SIN}(2 \cdot (\theta + dB/R))) \cdot EX \quad (10)$$

$$CYp = (L+dY) \cdot (M - \text{COS}(2 \cdot (\theta - dX/R))) \cdot EX \quad (11)$$

$$SBp = (L+dB) \cdot (M - \text{SIN}(2 \cdot (\theta - dA/R))) \cdot EX \quad (12)$$

$$CXn = (L-dX) \cdot (M + \text{COS}(2 \cdot (\theta - dY/R))) \cdot EX \quad (13)$$

$$SAn = (L-dA) \cdot (M + \text{SIN}(2 \cdot (\theta - dB/R))) \cdot EX \quad (14)$$

$$CYn = (L-dY) \cdot (M - \text{COS}(2 \cdot (\theta + dX/R))) \cdot EX \quad (15)$$

$$SBn = (L-dB) \cdot (M - \text{SIN}(2 \cdot (\theta + dA/R))) \cdot EX \quad (16)$$

where, L and M are constant coefficients, and R is a mean radius of the resolver rotor 16. A numeral dA represents an expression (17), and dB an expression (18).

$$dA = (\sqrt{2}/2)(dX + dY) \quad (17)$$

$$dB = (\sqrt{2}/2)(dY - dX) \quad (18)$$

In each of the expressions 9 to 16, a quotient of $dZ/R$ ($Z = Y$, A, X or B) in a sine (SIN) or cosine (COS) is negligible. Therefore, a composite output signal Co or So of output signals of the four secondary coils connected in series is represented as an expression (19) or (20).

$$Co = CXp - CYp + CXn - CYn = 4L \cdot \text{COS}(2\theta) \cdot EX \quad (19)$$

$$So = SAp - SBp + SAn - SBn = 4L \cdot \text{SIN}(2\theta) \cdot EX \quad (20)$$

These two output signals Co and So are sampled and held by the SMPL signal from the oscillator 29 by the sample-and-hold circuits 37 and 38, when the AC signal EX shows the maximum gain. Assuming that the maximum gain of the AC signal EX is "$\frac{1}{2}$", output signals C and S of the sample-and-hold circuits 37 and 38 are given by assigning "$EX = \frac{1}{2}$" to the expressions (19) and (20) or represented as the below expressions (21) and (22).

$$c = 2L \cdot \text{COS}(2\theta) \quad (21)$$

$$S = 2L \cdot \text{SIN}(2\theta) \quad (22)$$

Then, the output signals C and S whose levels are proportional to a cosine-wave value and a sine-wave value of a two-fold value of a rotary displacement $\theta$ of the shaft 1 are input in an inverse tangent arithmetic logic unit 30. This provides a signal $\theta o = 2 \times \theta$. Thus, a value can be detected in direct proportion to a rotary displacement of the shaft 1.

In the aforesaid conventional multi-displacement detecting apparatus, multiple displacement sensors are arranged in the axial direction of a main shaft. This extends the axial length, complicates the mounting of the displacement sensors, and increases cost.

SUMMARY OF THE INVENTION

The object of the present invention is to solve the foregoing problems or to provide a multi-displacement detecting apparatus capable of being compactly designed and simply structured.

The present invention relates to a multi-displacement detecting apparatus capable of simultaneously detecting multiple displacements including a rotary displacement and a radial displacement of a main shaft of a machine tool. To achieve the above object of the present invention, a multi-displacement detecting apparatus comprises a moving section having a surface continuously irregular in the moving direction, a stationary section opposing the irregular surface and including multiple sensors each outputting a signal that contains an output component whose level is proportional to a sine-wave value of a displacement in the moving direction and has an amplitude modulated in proportion to the variation in the gap from the irregular surface, and an arithmetic logic means for outputting a displacement of the moving section in the moving direction and another at least one displacement.

The nature, principle and utility of the invention will become more apparent from the following detailed description when read in conjunction with the accompanying drawings.

DESCRIPTION OF THE PREFERRED EMBODIMENTS

Figure 5:
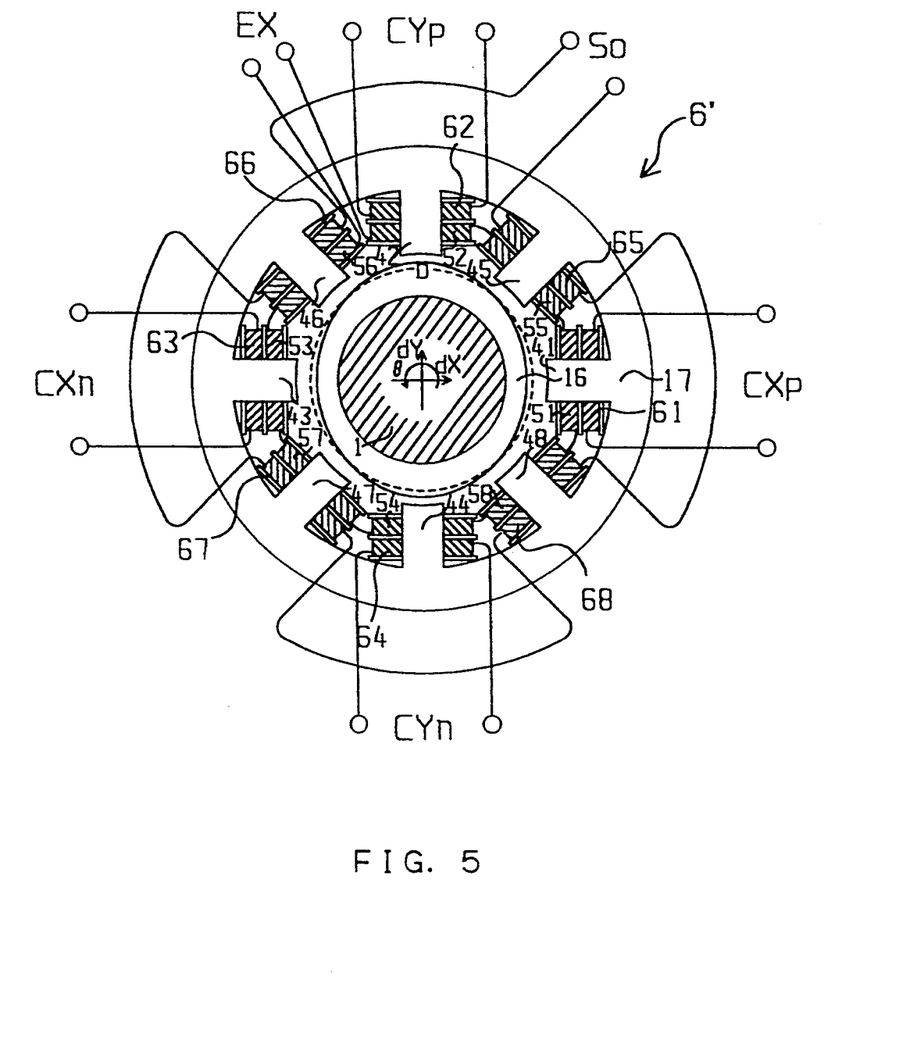
FIG. 5 shows an example of a structure of a displacement sensor or a component of a multi-displacement detecting apparatus of the present invention.
Figure 6:
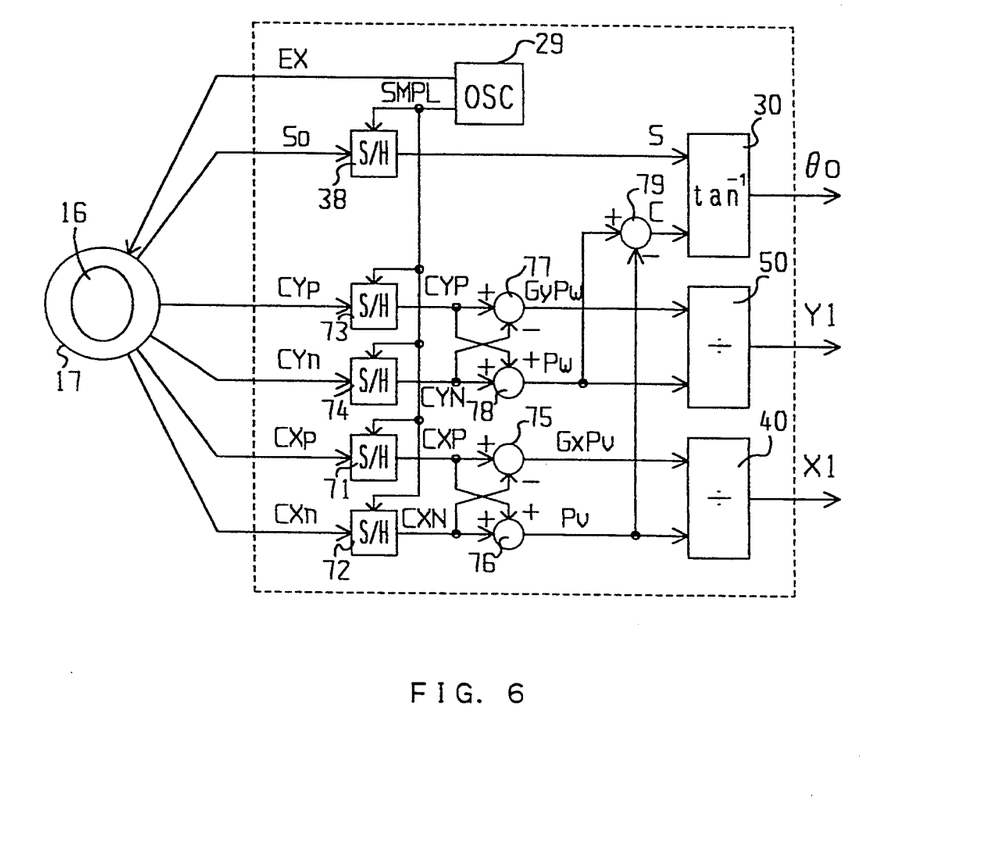
FIG. 6 is a block diagram showing an embodiment of a multi-displacement detecting apparatus of the present invention.

FIG. 5 shows an example of a structure of a displacement sensor or a component of a multi-displacement detecting apparatus of the present invention in comparison with FIG. 3. The same components are assigned the same numerals and the description thereof has been omitted. FIG. 6 is a block diagram showing an example of the multi-displacement detecting apparatus of the present invention that comprises the displacement sensor 6' of FIG. 5 and a detecting circuit for converting a detected signal into a quantity of displacement using multiple arithmetic logic units.

The secondary coils 61, 62, 63 and 64 are not connected in series. A composite signal So made up of the four output signals SAp, SAn, SBp and SBn of the secondary coils 65 to 68 and four other output signals CXp, CXn, CYp and CYn are sampled and held by the SMPL signal sent to the oscillator 29 by sample-and-hold circuits 38, 71, 72, 73 and 74, when the AC signal EX shows the maximum gain. Assuming that the maximum gain of the AC signal EX is "½" similarly to the aforesaid conventional detecting apparatus, the output signals S, CXP, CYP, CXN and CYN are given by assigning "EX=½" to the expressions (9) to (16). Herein, a quotient of dZ/R in a sine-wave or cosine-wave of each of the expressions (9) to (16) (Z=Y, A, X or B) is negligible. Therefore, the output signals S, CXP, CYP, CXN and CYN are represented as expressions (23) to (27).

$$S = 2L \cdot \mathrm{SIN}\,(2\theta) \tag{23}$$

$$CXP = (L + dX) \cdot (M + \mathrm{COS}\,(2\theta))/2 \tag{24}$$

$$CXN = (L - dX) \cdot (M + \mathrm{COS}\,(2\theta))/2 \tag{25}$$

$$CYP = (L + dY) \cdot (M - \mathrm{COS}\,(2\theta))/2 \tag{26}$$

$$CYN = (L - dY) \cdot (M - \mathrm{COS}\,(2\theta))/2 \tag{27}$$

The output signals CXP and CXN are respectively supplied to a subtractor 75 and an adder 76 for subtraction and addition. The output signals CYP and CYN are respectively supplied to a subtractor 77 and an adder 78 for subtraction and addition. As a result, signals GxPv, Pv, GyPw and Pw represented as expressions (28) to (31) are provided.

$$GxPv = dX \cdot (M + \mathrm{COS}\,(2\theta)) \tag{28}$$

$$Pv = L \cdot (M + \mathrm{COS}\,(2\theta)) \tag{29}$$

$$GyPw = dY \cdot (M - \mathrm{COS}\,(2\theta)) \tag{30}$$

$$Pw = L \cdot (M - \mathrm{COS}\,(2\theta)) \tag{31}$$

The output signals GxPv and Pv and GyPw and Pw are respectively supplied to dividers 40 and 50 for division. This provides signals X1 and Y1 represented as expressions (32) and (33). Thus, values can be detected in direct proportion to the X- and Y-axis displacements.

$$X1 = GxPv/Pv = dX/L \tag{32}$$

$$Y1 = GyPw/Pw = dY/L \tag{33}$$

where, L denotes a constant coefficient.

On the other hand, the output signals Pv and Pw are supplied to a subtractor 79 for subtraction. This subtraction provides the same signal C as that given by the expression (21). Then, output signals C and S whose levels are proportional to the cosine-wave and sine-wave values of a two-fold value of a rotary displacement $\theta$ of a shaft 1 are put in an inverse tangent arithmetic logic unit 30. Then, a signal $\theta o = 2 \times \theta$ is provided.

Figure 7:
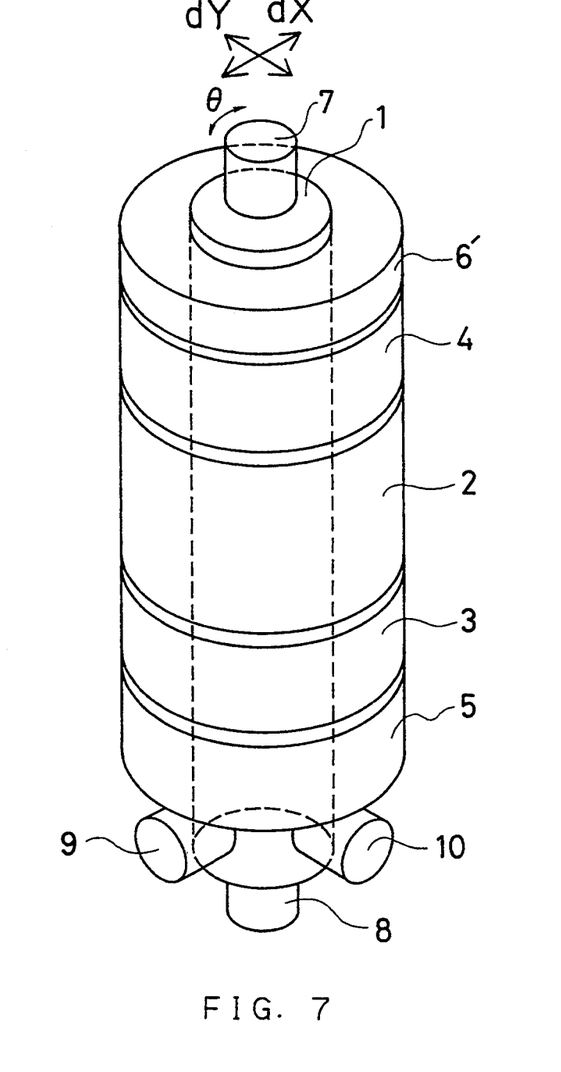
FIG. 7 is an oblique view of a modeled example of a spindle using a magnetic bearing with the multi-displacement detecting apparatus shown in FIG. 6 incorporated therewith and having a built-in motor.

Thus, a value can be detected in direct proportion to the rotary displacement of the shaft 1. FIG. 7 shows the aforesaid multi-displacement detecting apparatus incorporated in the shaft 1 using a magnetic bearing and having a built-in motor. Herein, the conventional radial displacement sensors 11, 12, 13 and 14 are not included. This realizes a compact design.

Figure 8:
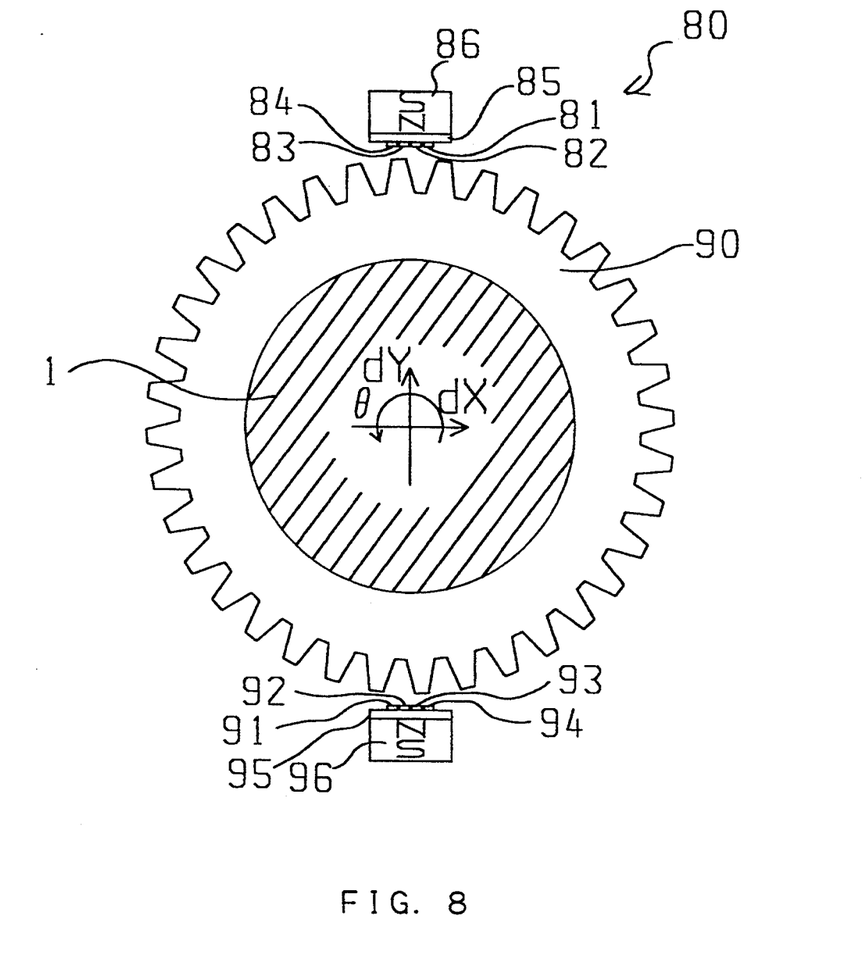
FIG. 8 shows an example of another structure of a displacement sensor or a component of a multi-displacement detecting apparatus of the present invention.
Figure 9:
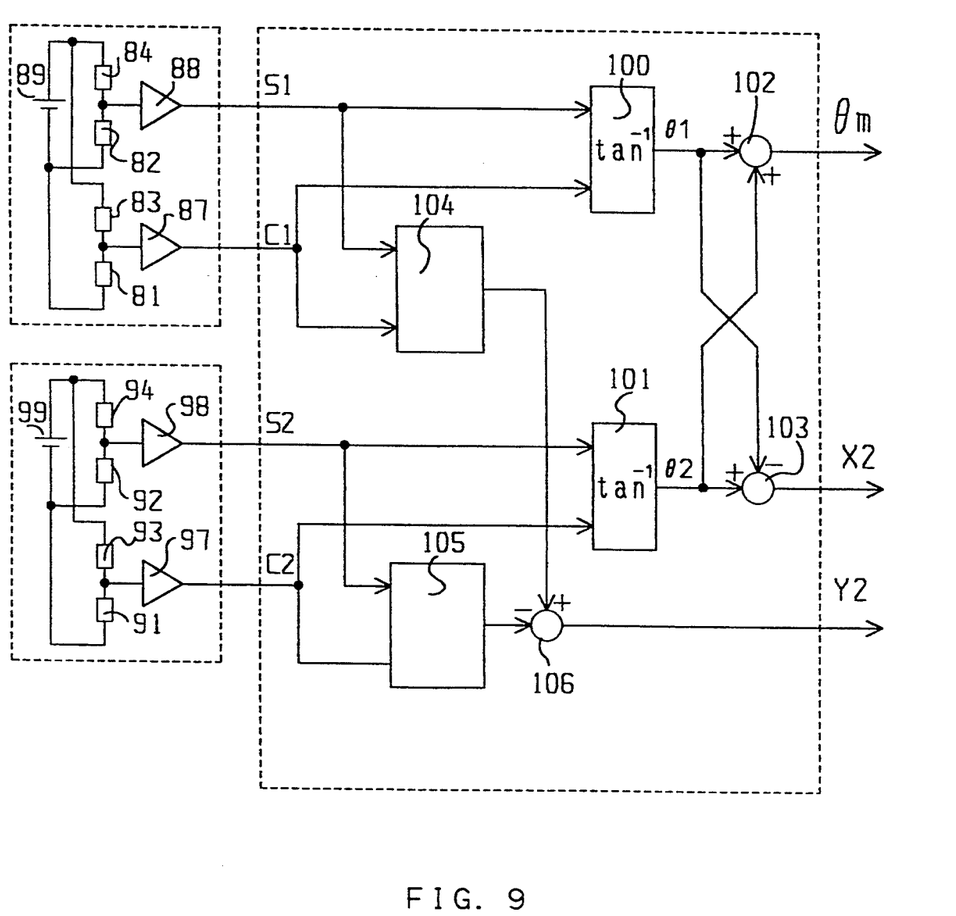
FIG. 9 is a block diagram showing other embodiment of a multi-displacement detecting apparatus of the present invention.

FIG. 8 shows an example of another structure of a displacement sensor or a component of a multi-displacement detecting apparatus of the present invention. FIG. 9 is a block diagram showing an embodiment of a multi-displacement detecting apparatus of the present invention that includes the displacement sensor 80 shown in FIG. 8 and a detecting circuit for converting a detected signal into a quantity of displacement using multiple arithmetic logic units. A rotor 90 has a gear-like irregular surface or has 36 teeth and is made of iron or another magnetic substance. The rotor 90 is attached to the shaft 1. Printed-circuit boards 85 and 95 lie at positions of point symmetry across the rotation center of the shaft 1. Magnetic sensors of magnetic resistance elements 81, 82, 83 and 84, and 91, 92, 93 and 94 are mounted on the printed-circuit board 85 and 95 respectively at intervals of a quarter tooth pitch of the rotor 90. Two sets of the magnetic sensors 81, 82, 83 and 84, and 91, 92, 93 and 94 are biased magnetically by permanent magnets 86 and 96.

In the foregoing configuration, when the rotor 90 changes its position, the reluctance between the permanent magnets 86 and 96 and the rotor 90 varies. This moves magnetic flux acting in the magnetic resistance elements 81, 82, 83 and 84, and 91, 92, 93 and 94. The magnetic resistance elements 81 and 83, and 82 and 84 are connected in series respectively, and energized by a power supply 89 connected across them. Similarly, the magnetic resistance elements 91 and 93, and 92 and 94 are connected in series respectively and energized by a power supply 99 connected across them. Therefore, voltages V81, V82, V83 and V84, and V91, V92, V93 and V94 developing at the magnetic resistance elements 81, 82, 83 and 84, and 91, 92, 93 and 94 are determined by the rotary displacement $\theta$ and X- and Y-axis displacements dX and dY of the rotor 90, and represented as below expressions (34) to (41). This provides signals that contain components whose levels are proportional to a sine-wave value of the rotary displacement and has an amplitude modulated according to the variations in the gaps of the magnetic resistance elements 81, 82, 83 and 84, and 91, 92, 93 and 94 from the rotor 90.

$$V81 = (P + dY) \cdot (Q + \mathrm{COS}\,(36 \cdot (\theta - dX/E))) \tag{34}$$

$$V82 = (P + dY) \cdot (Q + \mathrm{SIN}\,(36 \cdot (\theta - dX/E))) \tag{35}$$

$$V83 = (P + dY) \cdot (Q - \mathrm{COS}\,(36 \cdot (\theta - dX/E))) \tag{36}$$

$$V84 = (P + dY) \cdot (Q - \mathrm{SIN}\,(36 \cdot (\theta - dX/E))) \tag{37}$$

$$V91 = (P - dY) \cdot (Q + \mathrm{COS}\,(36 \cdot (\theta + dX/E))) \tag{38}$$

$$V92 = (P - dY) \cdot (Q + \mathrm{SIN}\,(36 \cdot (\theta + dX/E))) \tag{39}$$

$$V93 = (P - dY) \cdot (Q - \mathrm{COS}\,(36 \cdot (\theta + dX/E))) \tag{40}$$

$$V94 = (P - dY) \cdot (Q - \mathrm{SIN}\,(36 \cdot (\theta + dX/E))) \tag{41}$$

where, P and Q are constant coefficients, and E a mean radius of the rotor 90.

Signals occurring with subtracted voltages of the magnetic resistance elements 81 and 83, 82 and 84, 91 and 93, and 92 and 94 developing at the junctions between the magnetic resistance elements 81 and 83, 82 and 84, 91 and 93, and 92 and 94 are respectively supplied to amplifiers 87, 88, 97 and 98 where they are amplified and output to provide signals C1, S1, C2 and S2. The impedance levels at the junctions may also be modified by the amplifiers. The output signals C1, S1, C2 and S2 are represented as below expressions (42) to (45).

$$C1 = V81 - V83 = 2 \cdot (P + dY) \cdot \cos(36 \cdot (\theta - dX/E)) \quad (42)$$

$$S1 = V82 - V84 = 2 \cdot (P + dY) \cdot \sin(36 \cdot (\theta - dX/E)) \quad (43)$$

$$C2 = V91 - V93 = 2 \cdot (P - dY) \cdot \cos(36 \cdot (\theta + dX/E)) \quad (44)$$

$$S2 = V92 - V94 = 2 \cdot (P - dY) \cdot \sin(36 \cdot (\theta + dX/E)) \quad (45)$$

where, the output signals C1 and S1, and C2 and S2 are respectively supplied to inverse tangent arithmetic logic units 100 and 101, then converted to signals $\theta 1$ and $\theta 2$ represented as expressions as (46) and (47).

$$\theta 1 = 36 \cdot (\theta - dX/E) \quad (46)$$

$$\theta 2 = 36 \cdot (\theta + dX/E) \quad (47)$$

The output signals $\theta 1$ and $\theta 2$ are respectively supplied to an adder 102 and a subtractor 103 for addition and subtraction. This provides signals $\theta m$ and X2 represented as below expressions (48) and (49).

$$\theta m = \theta 1 + \theta 2 = 72 \cdot \theta \quad (48)$$

$$X2 = 72 \cdot dX/E \quad (49)$$

Thus, the values can be detected in direct proportion to the rotary displacement and the X-axis displacement of the shaft 1. The output signals C1 and S1, and C2 and S2 are respectively supplied to an arithmetic logic unit 104 and 105 in which roots of sums of binomial squares are calculated. The output signals of the arithmetic logic units 104 and 105 are processed by a subtractor 106 to provide a signal Y2 represented as an expression (50).

$$Y2 = \sqrt{(C1^2 + S1^2)} - \sqrt{(C2^2 + S2^2)} = 4 \cdot dY \quad (50)$$

Figure 10:
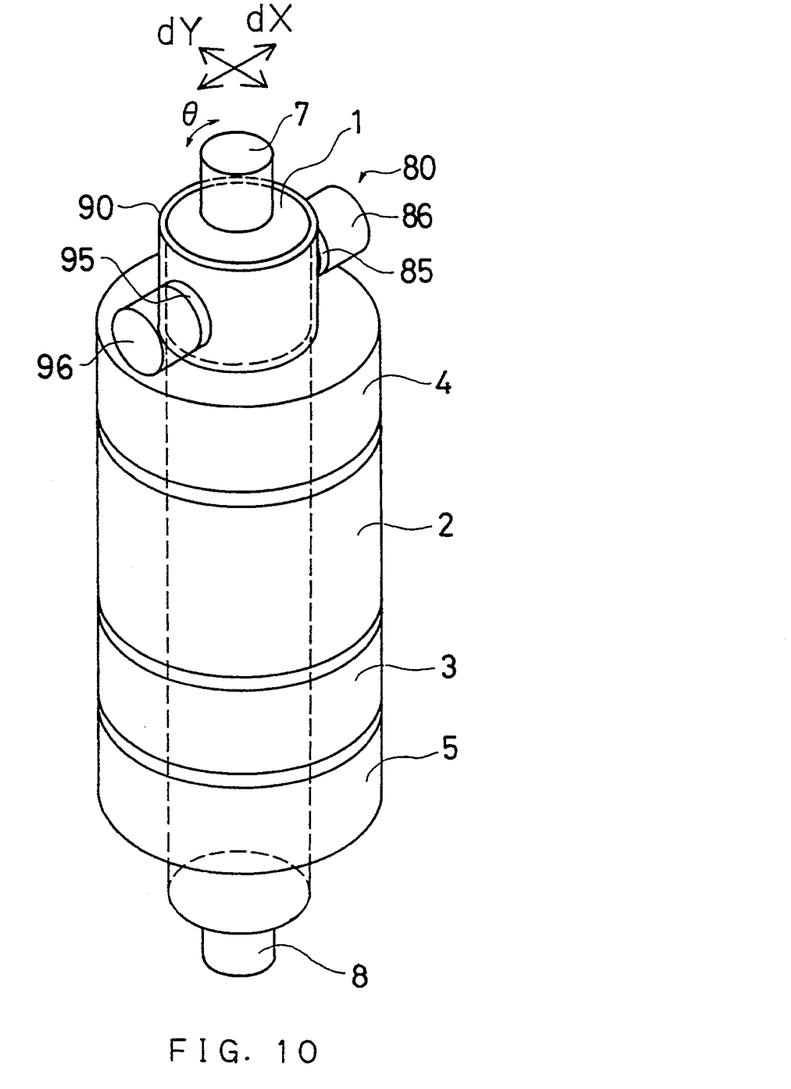
FIG. 10 is an oblique view of a modeled example of a spindle using a magnetic bearing with the multi-displacement detecting apparatus of FIG. 9 incorporated therewith and having a built-in motor.

Thus, a value can be detected in direct proportion to the Y-axis displacement detecting apparatus incorporated in the spindle using a magnetic bearing and having a built-in motor. Unlike the aforesaid conventional detecting apparatus, the resolver 6, and the radial displacement sensors 11, 12, 13 and 14 are not included. This results in a compact design.

As described previously, according to a multi-displacement detecting apparatus of the present invention, a compact design and a simple structure are realized. This reduces the time required for mounting displacement sensors, minimizes cost, and expands the scope of a multi-displacement detecting apparatus.

It should be understood that many modifications and adaptations of the invention will become apparent to those skilled in the art and it is intended to encompass such obvious modifications and changes in the scope of the claims appended hereto.

What is claimed is:

1. A multi-displacement detecting apparatus, comprising:
   a moving section whose surface is continuously irregular in the moving direction;
   a stationary section including a plurality of sensors each outputting a signal that contains an output component whose level is proportional to a sine-wave value of a displacement in said moving direction and has an amplitude modulated in proportion to a variation in a gap from said irregular surface; and
   an arithmetic logic circuit for receiving output signals from said plurality of sensors and for outputting signals indicative of a displacement in said moving direction and another at least one displacement of said moving section;
   wherein said moving section is a cylindrical rotor made of a magnetic substance;
   and wherein said plurality of sensors include two pairs of sensors arranged point-symmetrically across a rotation center of said moving section, wherein said arithmetic logic circuit includes means for converting output signals of said two pairs of sensors into two respective sine-wave value signals whose levels are proportional to a sine-wave value of a rotary displacement of said moving section and two corresponding respective cosine-wave value signals whose respective phases differ 90° from said two sine-wave value signals, and wherein said arithmetic logic circuit also includes means for performing additions and subtractions using two inverse tangent values respectively calculated with one of said sine-wave value signals and a respective one of said cosine-wave value signals and for providing signals indicative of a rotary displacement and a displacement perpendicular to a straight line linking said two pairs of sensors.

2. A multi-displacement detecting apparatus according to claim 1, wherein said two pairs of sensors include a plurality of magnetic resistance elements that are magnetically biased by magnets.

* * * * *